Feb. 15, 1927.    L. S. KUBIAC    1,618,127
CLUTCH
Filed Aug. 26, 1925
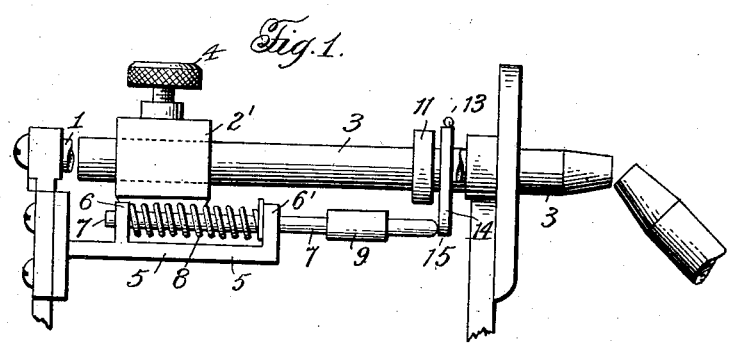
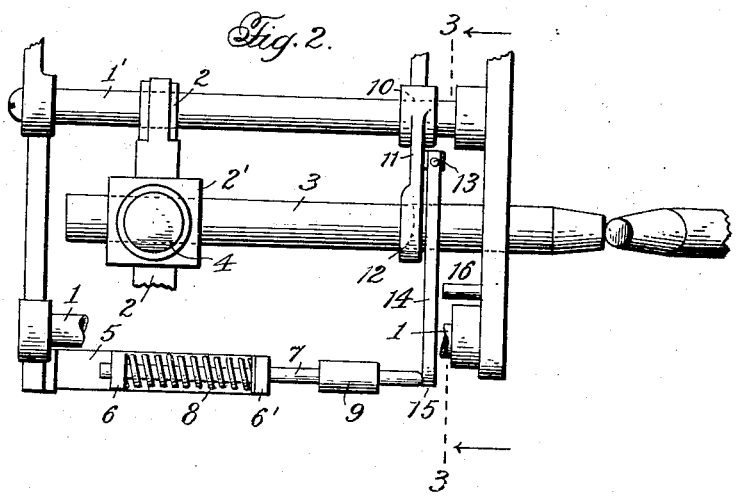
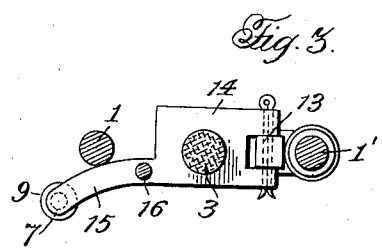
Witness:
Jas. E. Hutchinson
Inventor:
Lester S. Koubiac,
By W. C. Carman
Attorney Patented Feb. 15, 1927.

1,618,127

UNITED STATES PATENT OFFICE.

LESTER S. KUBIAC, OF YOUNGSTOWN, OHIO, ASSIGNOR TO THE PHOTOGENIC MACHINE COMPANY, OF YOUNGSTOWN, OHIO, A CORPORATION OF OHIO.

CLUTCH.

Application filed August 26, 1925. Serial No. 52,539.

My invention relates to clutches, the primary object being to provide a simple mechanism for the operation of a clutch adapted more particularly for use in connection with the control of electric lamp carbons when the same are disposed in a plane other than perpendicular.

When the carbon occupies a perpendicular plane the clutch member or arm gravitates automatically to its gripping or operative position, but when the carbon occupies a plane substantially away from the perpendicular the law of gravitation fails to serve, and the object of my invention is to provide mechanism which will act in lieu thereof.

In the drawings, Figure 1 is a side elevation of my device; Figure 2 is a top plan view partially broken away; and Figure 3 is a sectional view on line 3—3 Figure 2.

Similar reference characters designate corresponding parts throughout the various figures of the drawing.

Rigidly secured in the frame-work of the lamp are the rods 1 and 1', and slidably mounted upon these rods, by means of the oppositely extending arms 2—2, is the carbon carrier 2', provided with a central opening in which the carbon 3 is secured in any adjusted position by the screw 4.

Also secured to the frame-work of the lamp is the bar 5 (Figure 1), carrying the spaced lugs 6 and 6', thus forming a bracket in which is slidably mounted the stem 7, which is controlled by the coil spring 8 mounted thereon and confined between lugs 6 and 6'. To avoid short circuiting, this stem is made in two parts which are united by the insulating sleeve or ferrule 9.

Slidably mounted upon rod 1' only, as at 10 (see Figure 2), is what may be termed a clutch yoke 11, which is provided at one end with an opening 12 for the slidable reception of carbon 3, and swingingly mounted upon this yoke, as at 13, is the clutch member 14, which is also provided with a central opening for the carbon 3, and also with an elongated portion or finger 15 extending at substantially a right angle to the longitudinal plane of the stem 7 and adapted to contact with the point of the stem when moving in that direction.

Rigidly secured to the frame-work of the lamp is the post or snubber 16 (Figures 2 and 3) with the end of which the clutch member will contact when moving in the opposite direction.

The operation of my device is as follows: When the clutch yoke 11 is actuated by electrical energy by means of a solenoid, it travels along the rod 1', carrying with it the clutch member 14, and as the finger 15 of the clutch member 14 comes in contact with the point of the stem 7, the clutch member, through the resistance of the coil spring 8, will be forced to its oblique gripping or operative position on carbon 3, causing it to carry the carbon with it against the resistance of the spring 8, and when the circuit is broken and the yoke is drawn in the opposite direction by mechanical means, the finger 15 of the clutch member 14 will contact with the end of the post or snubber 16, thus forcing the clutch member out of its operative position and permitting the carbon to pass freely through it.

I claim:

1. In a clutch, the combination with a bar or rod to be controlled, of a clutch yoke slidably mounted upon a bar or guide parallel with the bar or rod to be controlled, a clutch member swingingly secured to said yoke and adapted to come into contact with means to force it into its operative position, and tripping means for releasing the clutch from operative position.

2. In a clutch, the combination with a bar or rod to be controlled, of a clutch yoke slidably mounted on a bar or guide parallel with the bar or rod to be controlled, a clutch member swingingly mounted upon said yoke and provided with an elongated portion or finger adapted to come into contact with spring resisted means to force it into its operative position, and tripping means for releasing the clutch from operative position.

In testimony whereof, I have hereunto affixed my signature.

LESTER S. KUBIAC.